(12) United States Patent
Hinderling et al.

(10) Patent No.: US 12,436,379 B2
(45) Date of Patent: Oct. 7, 2025

(54) SCANNING DEVICE WITH POINT-TO-POINT FOCUSING

(71) Applicant: HEXAGON TECHNOLOGY CENTER GMBH, Heerbrugg (CH)

(72) Inventors: Jürg Hinderling, Marbach (CH); Andreas Walser, St. Gallen (CH); Tim Mayer, Widnau (CH); Hannes Beyer, Romanshorn (CH); Oliver Rohrer, Lindau (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 972 days.

(21) Appl. No.: 17/546,910

(22) Filed: Dec. 9, 2021

(65) Prior Publication Data
US 2022/0187592 A1    Jun. 16, 2022

(30) Foreign Application Priority Data

Dec. 10, 2020   (EP) .................................. 20213118

(51) Int. Cl.
| | | |
|---|---|---|
| *G02B 26/08* | (2006.01) | |
| *G01B 11/30* | (2006.01) | |
| *G01S 17/89* | (2020.01) | |
| *G02B 26/10* | (2006.01) | |
| *G02B 27/30* | (2006.01) | |

(52) U.S. Cl.
CPC .......... *G02B 26/0875* (2013.01); *G01B 11/30* (2013.01); *G01S 17/89* (2013.01); *G02B 26/10* (2013.01); *G02B 27/30* (2013.01)

(58) Field of Classification Search
CPC .... G02B 26/0875; G02B 26/10; G02B 27/30; G01B 11/30; G01S 17/89

USPC ......................................................... 359/698
See application file for complete search history.

(56) References Cited

U.S. PATENT DOCUMENTS

| | | |
|---|---|---|
| 7,528,354 B2 | 5/2009 | Viinikanoja |
| 8,678,599 B2 | 3/2014 | Gollier |
| 9,322,646 B2 | 4/2016 | Pochiraju et al. |
| 9,658,059 B2 | 5/2017 | Metzler et al. |
| 9,658,335 B2 | 5/2017 | Siercks et al. |

(Continued)

FOREIGN PATENT DOCUMENTS

| | | |
|---|---|---|
| CN | 101460878 A | 6/2009 |
| CN | 102906630 A | 1/2013 |

(Continued)

OTHER PUBLICATIONS

Hou Maosheng et al., "Research on dynamic focusing system of laser scanning projection instrument," Journal of Applied Optics, vol. 39, Issue 5, pp. 605-612 (Sep. 2018).

(Continued)

*Primary Examiner* — William Choi
(74) *Attorney, Agent, or Firm* — Maschoff Brennan

(57) ABSTRACT

Method and opto-electronic measuring device for measuring of an object's surface with a measuring rate of at least one thousand object points per second. Using a high-speed autofocus optical module comprising at least one variable focal length lens or reconfigurable optical phase plate having a response time of under 1 ms, situated in an emitting beam path, there is a real-time focus adaption of the measurement beam within a single object point measurement period.

23 Claims, 5 Drawing Sheets

(56) References Cited

U.S. PATENT DOCUMENTS

| | | | |
|---|---|---|---|
| 10,119,816 | B2 | 11/2018 | Slotwinski et al. |
| 11,525,978 | B2 | 12/2022 | Kubo |
| 2005/0057741 | A1 | 3/2005 | Anderson et al. |
| 2008/0186551 | A1 | 8/2008 | Hanft et al. |
| 2010/0025566 | A1 | 2/2010 | Hargrove et al. |
| 2014/0300892 | A1* | 10/2014 | Zogg .................... G01C 15/002 356/73 |
| 2014/0307252 | A1 | 10/2014 | Hinderling et al. |
| 2018/0172831 | A1 | 6/2018 | Wohlgenannt et al. |

FOREIGN PATENT DOCUMENTS

| | | |
|---|---|---|
| CN | 104081156 A | 10/2014 |
| CN | 105308475 A | 2/2016 |
| CN | 105866132 A | 8/2016 |
| CN | 110850434 A | 2/2020 |
| EP | 2 620 745 A1 | 7/2013 |
| EP | 3339901 B1 | 6/2018 |
| WO | 2008/068791 A1 | 6/2008 |
| WO | 2016/134321 A1 | 8/2016 |

OTHER PUBLICATIONS

CN Office Action dated May 15, 2024 as received in Application No. 202111492422.1.
EP Search Report in Application No. 20213118.1 dated May 27, 2021.

\* cited by examiner

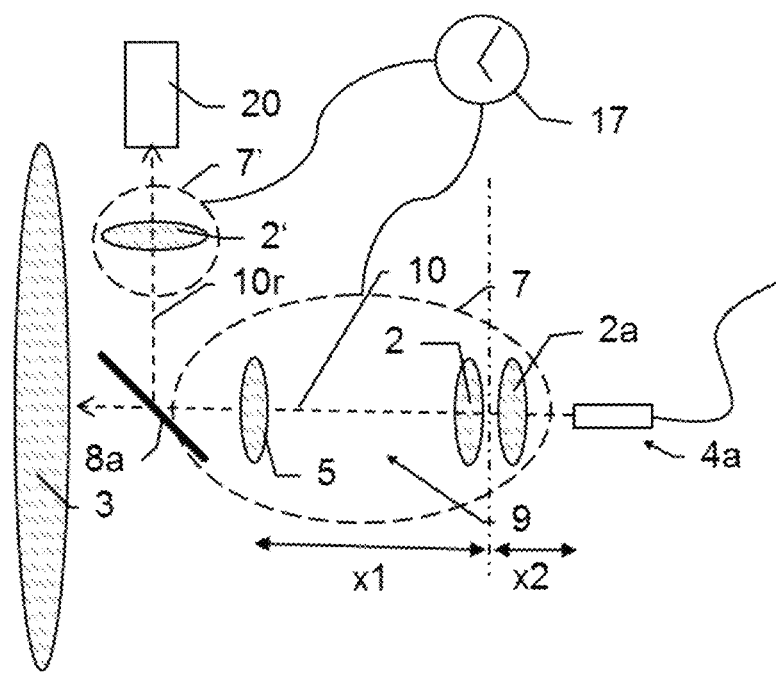
Fig. 5
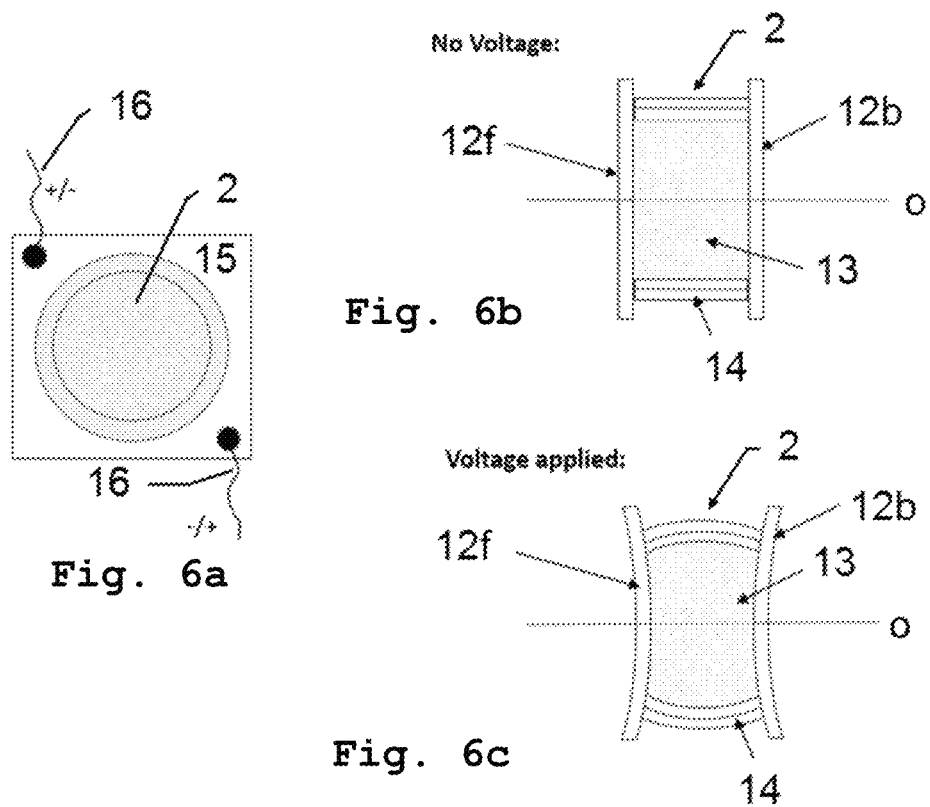
Fig. 6a
Fig. 6b
Fig. 6c

SCANNING DEVICE WITH POINT-TO-POINT FOCUSING

FIELD OF THE INVENTION

The invention relates to an opto-electronic scanning device and method.

BACKGROUND

Opto-electronic scanning devices such as laser trackers, scanning total stations as for example the Leica MS60 total station or laser scanners are used for industrial, geodetical or metrological measurement, e.g. for coordinative position determination of points of a component such as a vehicle body or building for example in the context of surface inspection or for continuous position monitoring of a moving machine part. Such scanning instruments are designed for continuous coordinative position determination of target points. Laser trackers in particular have become an essential piece of metrology equipment in all kinds of industries for measuring small to large parts and providing a solution for large-scale inspection and assembly applications.

For measuring object points, an emission direction and respectively a reception direction of a measurement beam are ascertained, for example by means of sensors for angle measurement which are assigned to a deflection mirror or a targeting unit of the system. In addition, with the detection of the beam, a distance from the measuring apparatus to the target point is ascertained, e.g. by means of direct (pulse) time-of-flight as for example disclosed in EP3339901B, indirect (phase) time-of-flight, phase difference measurement/interferometry or by means of the Fizeau principle. The position coordinates of the target point are determined on the basis of the emission direction and respectively the reception direction and the distance. Said otherwise, the determination of the 3D coordinates is based on measuring the direct distance from the scanning device to the target surface of a natural or artificial object and by determining the horizontal angle or azimuth angle as well as the vertical angle or elevation angle under which the target is aimed at.

Hence, dense coordinative point measuring or 3D scanning is a very effective technology for producing millions of spatial measurement points of objects within minutes or seconds, for example with a measurement rate of 1000, 100000 or even more than 1000000 points per second. Measurement projects with modern high-speed scanners produce so-called 3D point clouds having a cardinality of, for example, hundreds of millions or billions of object points and beyond. Typical measurement tasks are the recording of objects or the surfaces thereof such as industrial work pieces as metal parts, industrial plants, house facades or historical buildings, but also accident sites and crime scenes. As said, typical surveying apparatuses with scanning functionality are laser trackers or laser scanners which are used to measure or create 3D coordinates of surfaces. Referencing the position and orientation of the metrological device to either a local or global reference coordinate system further enables the determination of the 3D coordinates as either local or global 3D coordinates.

For this purpose, they have to be able to guide the measurement beam of a distance measuring device over a surface and in the process simultaneously to detect direction and distance with respect to the measurement point. Since the laser beam is typically swept over the object surface in a continuous manner, the measured points themselves are the result of an accumulation of many laser shots, depending on the configuration of the range finder unit. The movement of the laser beam over the target usually is not a stop-and-go movement, but a smooth movement. From the distance and the direction information correlated therewith for each point, a 3D point cloud is generated by means of data processing. Besides measuring natural, diffusely scattering surfaces, some devices such as laser trackers or theodolite based robotic multistations are designed also for measuring and possibly continuous tracking of a retroreflective target point (cooperative reflecting objects). In this case, a target point can be represented by a retroreflective unit (e.g. cube prism) which is targeted by an optical measurement beam generated by a beam source of the measuring device or of the measuring apparatus, in particular a laser beam. The laser beam is reflected back to the measuring apparatus in a parallel fashion, the reflected beam being detected by detection means of the apparatus.

In terms of the fundamental structure, such terrestrial or industrial scanners are thus designed to detect a distance to an object point as measurement point using a, usually electro-optical and laser-based, distance measuring device. A direction deflecting unit likewise present is in this case designed in such a way that the measurement beam of the distance measuring device is deflected in at least two independent spatial directions, as a result of which a spatial measurement region can be recorded. The deflecting unit can be realised in the form of a moving mirror or alternatively also by other elements suitable for controlled angular deflection of optical radiation, such as, for example, rotatable prisms, movable optical waveguides, deformable optical components, etc. Usually distance and angles are determined, that is to say the target is measured in spherical coordinates, which can also be transformed into Cartesian coordinates for display and further processing. The distance measuring device can be embodied for example according to the principles of time-of-flight (TOF), phase, waveform digitizer (WFD), frequency modulated continuous wave (FMCW), or interferometric measurement. For fast and accurate scanners, in particular a short measurement time in conjunction with high measurement accuracy is required, for example a distance accuracy in the mm range or below in the range of micrometres, with measurement times of the individual points in the sub-microseconds to milliseconds range. In this case, the measurement region ranges from a few centimetres up to a few kilometres.

The spatial measurement resolution is of particular importance in this case. It determines what details can still be identified, the duration of the scanning process, and the volume of data obtained in the process.

As said, the jitter and accuracy of the distance measurement can be very precise, for example 10 um and 60 um, respectively. However, in devices according to the state of the art, the laser spot of the measurement beam on the diffusely scattering surface is rather large. The beam diameter at the exit aperture is typically 4 mm (1/e2) and increases with increasing distance. Therefore, the spot at the illuminated surface is 4 mm in diameter or even bigger, so lateral spatial resolution is low especially compared to the longitudinal resolution of a range finder yielding a few micrometres. Depending on the wavelength of the emitted or exit beam, its diameter is mostly designed to be in the range of a few millimetres to keep the beam divergence small, otherwise the Rayleigh range would be at a few meters for a collimated beam and spots at distances beyond the Rayleigh range would become rapidly big. For example, for a laser wavelength of 1550 nm and an emitting diameter at the exit aperture of 0.5 mm the Rayleigh range is only 0.127 m and the divergence angle 4.0 mrad. At 10 m distance the beam diameter increases by 40 mm which is disadvantageously big.

As a summary, the measuring devices and methods known in the art are insufficient with respect to (lateral) spatial measuring resolution.

SUMMARY

The disclosed embodiments improve the spatial measuring resolution of an opto-electronic measuring device resp. measuring method.

These aspects are achieved at least in part by a device and method in accordance with the independent claims or by developments as reproduced in the dependent claims.

The disclosed embodiments relate to an opto-electronic measuring device such as a laser scanner or laser tracker for point cloud acquisition by measuring of an object's surface with a measuring rate of at least a thousand, and typically 100-thousand object points per second. The opto-electronic device has a base and a targeting unit, which is rotatable in relation to the base, preferably about two axes orthogonal to each other, and defines a target axis for targeting the object to be measured. The device further comprises a light source, preferably a so-called diffraction limited point light, pulsed and/or single-mode light source, for generation of a measurement beam. The measurement beam can be emitted by an exit aperture as a free beam in direction of the target axis towards a point on the object's surface to be measured with an emitting measurement beam path in between the light source and the exit aperture.

The device further comprises a high-speed autofocus optical module, situated in the emitting beam path, designed for a real-time measurement focus adaption within a single object point measurement period and comprising a variable focal length lens or a reconfigurable optical phase plate having a response time of under 1 ms, particularly a response time of 10 microseconds at most.

Said otherwise, using such an ultrafast varifocal lens or reconfigurable optical phase plate inside an autofocus optical arrangement, the focus of the measurement beam is automatically variable on-the-fly within (much) less than a millisecond, wherein preferably the real-time focusing is an individual adaption of focus for a respective object point. Every single point of the object's surface is measurable with a specific focus setting as the focus can be adapted within the timespan needed for measuring the single object point (i.e. the single object point measurement period). Such point-to-point focusing also comprises a continuously controlled adaption of the focal point when moving along a line on the object surface.

As a preferred option, the focal power range of the autofocus optical module is adapted to a nominal or predefined maximal measurement range of the device in such a way that by variation of the focal length of the at least one variable focal length lens said real-time focusing is enabled throughout the whole measurement range of the scanning instrument. The autofocus optics resp. the varifocal lens or reconfigurable optical phase plate is designed for continuous and stepless automatic adaption of the beam focus within the complete working range of the device, in particular including the close range. The close range is to be understood as the direct surrounding of the device, i.e. the first meters or an object at a measurement distance of practically zero to several meters, e.g. 10 or 15 meters, in particular down to 1 m from the exit aperture of the device. Optionally, the maximal measurement range is at least 20 m or 50 m or even 1000 m. In other words, the autofocus optics is designed in such a way that it is not limiting the measurement range defined by other components of the device. Rather to the contrary, the working range can be extended as limiting factors or components of prior art devices such as a fix focus optic are obsolete and above that no (manual) switch between different working range modes is needed. The optics of the emitting light channel typically comprises several optical elements as beam deflection and/or beam-splitter units, the autofocus optical module and collimating optics. The autofocus optical module itself comprises at least one variable focal length lens or reconfigurable optical phase plate for setting the required optical power to adjust the laser beam focus to the target distance. As an example, the focal power of the variable focal length lens or the reconfigurable optical phase plate can be varied at least from 0 $m^{-1}$ to 10 $m^{-1}$ or from 6 $m^{-1}$ to 6 $m^{-1}$ or from $-3$ $m^{-1}$ to 10 $m^{-1}$, respectively. The preferred setting range of the variable focal length lens itself is at least 10 $m^{-1}$ whereas that of the complete autofocus optical module is lower because of its special optical layout as explained below. As an example, the setting range of the power of the autofocus optical module is at least 1 $m^{-1}$.

As an option, the high-speed autofocus optical module comprises at least one collimation lens whereas the variable focal length lens or the reconfigurable optical phase plate is located between the collimation lens and the near field of the light source. As known in the field of optics, the near field is defined as the plane which is imaged by the optical system of the transmission channel versus the target object.

Thereby, the distance along the beam path from the variable focal length lens or reconfigurable optical phase plate to the aperture lens or collimation optics is preferably greater than the distance from the variable focal length lens or reconfigurable optical phase plate to the near field of the light source, in particular wherein the distances' ratio is at least 2:1. Alternatively or additionally, the variable focal length lens or reconfigurable optical phase plate is situated directly after the near field of the light source (in the direction of propagation of the light beam or beam path orientation). There, the beam diameter has a small radial extent.

Optionally, the ratio of the exit diameter of the measurement beam (the beam's diameter at the exit of the instrument or laser collimator) to the diameter of the variable focal length lens or reconfigurable optical phase plate is at least 2:1. As an option, the exit diameter of the measurement beam is at least 6 mm, in particular at least 10 mm. This diameter corresponds to the 1/e2-diameter of a Gaussian beam and is typically smaller than the diameters of apertures and optical components, preferably the diameter of the latter is at least 8 mm, in particular at least 15 mm. As another option, the diameter of the variable focal length lens or reconfigurable optical phase plate is 2 mm, or 6 mm, at most. It is to say that the smaller the lens diameter is or the closer the lens is situated to the nearfield of the light source, the more has the focal length of the lens or reconfigurable optical phase plate to be changed to result in a certain change of beam focus in object space. In other words, the demands on focal length range of the variable lens is the higher the smaller the lens diameter and the smaller distance between lens (or reconfigurable optical phase plate) and near field. Or equivalently, the focal length range of the variable lens (or reconfigurable optical phase plate) is the higher the longer distance between the variable lens (or reconfigurable optical phase plate) and the collimation optics at the exit aperture.

In a further embodiment, the device is designed both for measuring of retro-reflective and of diffusely scattering objects solely by virtue of the variable focus length lens or reconfigurable optical phase plate. That is, only using the varifocal lens or reconfigurable optical phase plate both types of targets can be measured, in particular wherein a switch is performed automatically by a controller of the autofocus optics. Optionally, variation from one target type to the other is done in real-time from point-to-point.

As another option, the response time is substantially fast within the temperature range of −40° C. to +70° C. In addition or alternatively, the lens comprises a deformable optical body or surface plate deformable by at least one piezo-electric element actuator mechanically coupled to the deformable body in order to change the lens' focal length by an axial symmetrical bending or deformation, e.g. torsion. As an option, the varifocal lens is a liquid lens with acoustically variable refractive index.

The disclosed embodiments also relate to a method for opto-electronic light-based measuring of an object's surface, in particular for a laser scanner or laser tracker according to claim 1. The method comprises measuring object points with a measurement rate of at least a thousand object points per second, using a measurement beam emitted into free space, in particular with an exit beam diameter of at least 6 mm, 7 mm or 10 mm, in direction of a target axis towards a respective object point to be measured. The method further comprises automatic real-time focusing of the measurement beam within a single object point measurement period, with a frequency of the focus adaption or change of at least 1 kHz, in particular at least 100 kHz.

Said otherwise, the light beam, e.g. laser beam focus is controlled 1000 times per second or more often, preferably adapting focus to a respective object point each, i.e. even for a measurement rate of 1000 points per second or above, each object point is measured with an individually tailored or customized beam focus.

As an option, the real-time focusing is based on a distance to a respective object point, said distance being measured with the measurement beam as a separate preceding probe measurement of a respective object point directly before the measuring of the object point. Said otherwise, every object point is measured twice: a first test measurement for obtaining a (rough) distance to the point and directly followed by the final measurement with the beam focused using the (rough) distance measured beforehand. This does not imply an interruption of the measuring sequence, because the laser short rate and thus the internal distance measurement rate of typically 5 MHz is much faster than the final rate of output point data.

As another option, such a distance for adjusting the focus based thereon is acquired within the measuring of a respective object point itself. That is to say, in the course of the coordinative measuring of a respective object point, a distance for focus adjustment is derived for instantly using it for this object point without any interruption of the measuring. For example, each single object point is measured using a sequence of radiation pulses (as in principle known in the art) and said distance is determined using a number of first pulses (one or more pulses) of the sequence. Thereby, for the final measurement result of the object point (i.e. its 3D-coordinates), the first pulses, having a non-optimized beam focus, may be disregarded and thus only be used for focus adjustment.

Optionally, the focusing is based on a distance to a respective object point, said distance being determined as a predictive value based on previous distance or focus trend. For example, a gradient or the like is derived from a distinct number of previous focus values for object points preceding the actual object point to be measured, and based on this gradient, the focal length of the varifocal length lens is extrapolated and set. Other options for focus control is to use a priorly known digital model of the object to be scanned, e.g. stored in a memory of the scanning device, and derive focus setting therefrom, or to use an actual image, e.g. taken by an overview camera of the measuring device, for determining focus settings. These focus setting options can be used together, too, for instance pre-setting the focus based on a camera image and starting therefrom, fine tuning the focus based on a distance measured with the measurement beam.

Hence, the real-time focus adaption is controlled by or based on a distance to a respective object point, the distance being measured by an initial (coarse) distance measurement, or by deriving a distance value using a digital surface model or a using a trend or tendency of distance and/or focus.

Optionally, the focus is adapted in such a way that there is a linear relationship between beam diameter of the emitted beam and measurement distance, preferably throughout the whole measurement range, in particular also in the close range shorter than the radiometric limiting distance of the receiver channel. The latter is the minimum distance where the radiometric so called "inverse square law" is valid.

Alternatively or additionally, a respective object point is measured with at least two, preferably at least three, different foci of the measurement beam, preferably within the accumulation series of light shots to a measurement point. For each focus setting, a distance is deduced, so two or three distances are recorded for a single object point. In other words, the focus is not only adapted from one object point to the next one or for each single object point, but in addition at least for selected object points, the focus is varied for a respective object point itself. For example, this can be used to obtain additional information about curvature of an object's surface.

In the close-range regime shorter than the radiometric limiting distance, it has been recognized that the laser speckles generate distance jitter when the emitting laser beam is focused onto the target surface. To reduce this parasitic range noise, also the receiver channel is optionally equipped with an inventive high-speed autofocus module. This additional or second autofocus inside the receiver channel for focus adaption of the received measurement light is operated synchronously with the first one of the emitting channel. This double embedded autofocus method with a first high-speed autofocus module in the emitting beam path and a second high-speed autofocus module in the receiving beam path results in a much higher precision of the measured distance. For object distances longer than the radiometric limiting distance however, the receiver autofocus module can be statically set to infinity without loss of accuracy.

The disclosed embodiments also relate to a computer programmer product comprising programme code, which is stored on a machine-readable medium, or being embodied by an electromagnetic wave comprising a programme code segment, and having computer-executable instructions for performing, in particular when run on an opto-electronic measuring device, the method described.

The disclosed embodiments provide the advantage of a measuring device for surveying or metrological use having a very fast varifocal lens or reconfigurable optical phase plate with reaction times under 1 millisecond or faster and focus control for each object point. The measurement beam can be on-the-fly focused on a respective point of the object's surface even confronted with the fast object point acquisition as is the case of 3D-scanning such as ten or hundred thousand points per second. The measurement unit itself has an internal acquisition rate of much higher speed, for example a laser shot rate of 5 MHz to allow a rapid focus setting, e.g. with $1^{st}$ initial course distance measurements within a fraction of a microsecond. Coarse distance measurements are sufficiently for beam focusing as long as the precision is within the focal depth. Using the present method of instantaneous focus control, the measurement focus can be substantially improved or optimized and thus, the spatial resolution, in particular in direction along the object's surface, is considerably improved compared to known solutions. In particular, the measurement focus is best fitted or optimised for every object point measured.

The amplitude of focus variation can thereby be high. The varifocal lens or reconfigurable optical phase plate advantageously not only has a wide focal length range of for example ten or twenty of dioptre, but any focal length therein can be requested and used within very short time. That is not only a broad measurement range as such is covered but a sudden and large change of measurement distance, e.g. several meters or tens of meters, from one point to another during scanning can be adapted to with respect to focusing.

Since the laser shot rate is fast, typically 5 MHz, coarse distance results can be derived from a single or a few shots which distance accuracy is sufficient for setting the autofocus to have the target surface within the depth of beam focus. For a fine distance measurement with a precision of a few micrometres however, data acquisition of many laser shots is required. A distance with low range noise can be achieved either by signal accumulation of a train of pulses or by averaging the raw distances of pulse series. Typically, 900 laser pulses are collected for a precise data point when the scanning rate is 1 k point per second.

BRIEF DESCRIPTION OF THE DRAWINGS

The method and the device will be described in greater detail hereafter solely as examples on the basis of concrete exemplary embodiments, which are schematically shown in the drawings. Further advantages will also be discussed here.

In the individual figures:

FIG. 5 shows another schematic example of inner components of an opto-electronic device;

FIGS. 6a-6c show an exemplary variable focus length lens in detail;

DETAILED DESCRIPTION

Figure 1:
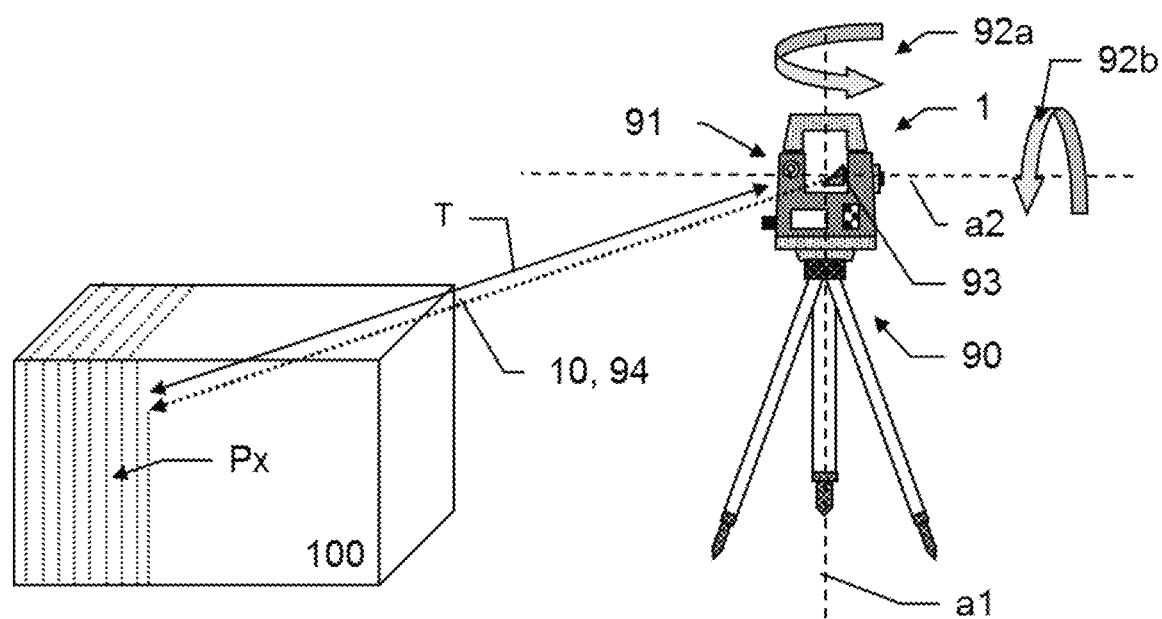
FIG. 1 shows an example of an opto-electronic device.

FIG. 1 shows an opto-electronic device 1 for 3D-point cloud acquisition according to the type, in the example embodied as a scanning device in form of a stationary laser scanner, e.g. for industrial measurement or surveying purposes, for recording object surfaces 100. Other preferred examples of devices 1 according to the type are laser trackers as well known in the art of metrology.

Figure 2:
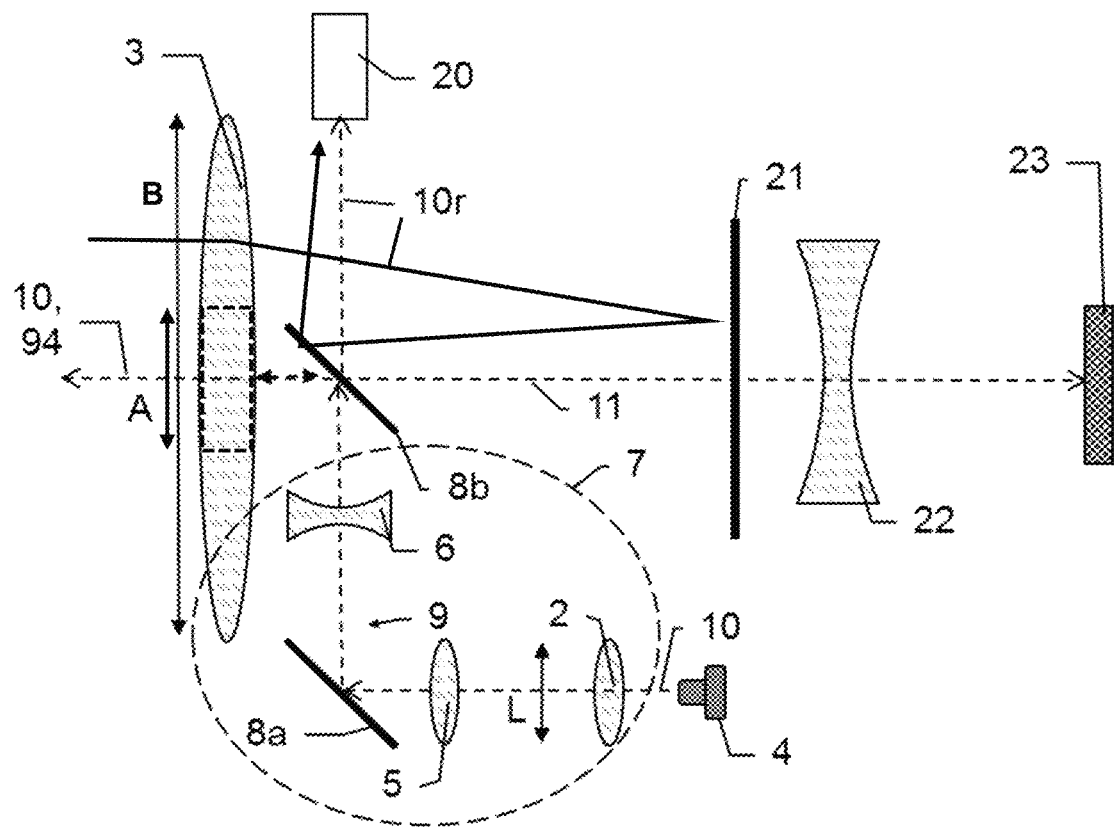
FIG. 2 shows a schematic example of inner components of an opto-electronic device.

Here, the metrological scanning device 1 is embodied to emit measurement radiation 10 in accordance with a specific measurement or targeting direction 94 as a free beam by a targeting unit 91 through an exit aperture (see FIG. 2). The targeting unit 91 can have a telescopic sight having an objective and having an ocular, i.e., it is equipped with a transparent visual light channel. Other embodiments can also have, additionally or alternatively to the optical telescope, a digital ocular and/or a screen display on an internally integrated operating unit or an external control unit. The targeting direction 94 also can be defined by an opto-electronic target aiming unit which consists of the front part of the telescopic sight system and a camera sensor 23 in the image plane of the backside part of the optical system. The targeting direction 94 is typically orthogonal to the two axes a1 and a2 explained below.

The targeting unit 91 defines the targeting axis 94 and the targeting unit 91 (and therewith targeting direction 94) is rotatable with respect to a base 90. Measurement radiation that is reflected or scattered by the surface 100 is received by the targeting unit 91 and evaluated, e.g. by well-known means such as a time-of-flight or phase difference method. For the purposes of high speed or scanning sensing of an object surface 100, the measurement radiation 10 is continuously swept by rotation of the targeting axis 94 about at least one axis, or as shown two axes a1 and a2. The first rotation axis a1 is the rotation axis of the base of the targeting unit 91 and the second axis a1 the rotation axis of a rotating mirror 93 or a telescope.

At least one measurement value is successively recorded in each case after short time intervals, this including a distance T to the respective object point Px in any case, and so a multiplicity of measurement directions are present, which are each measured by way of e.g. angle sensors for a respective axis a1, a2, wherein an object point Px is coordinatively measured in each case for a measurement direction 94 and hence a multiplicity of points Px of the object surface 100 are measured which may be presented in form of a dense 3D point cloud, representing the surfaces of object 100 in detail. Therefore, the device 1 can survey a targeted point of target object 100 in polar coordinates using the two angle meters and the distance meter. The polar coordinates can subsequently also be converted into other coordinate systems or more complex surveying tasks and calculations can be carried out based thereon, which can be carried out in a controlled manner via an operating unit, for example, by a digital computer within the device 1 or using an external computer or a cloud data service network.

In addition to the 3D coordinates of a respective object point Px (resp. the distance T and direction measurement values), the first scan data record, in this case, may comprise further data, e.g. intensity or brightness of the measurement radiation, a noise dimension, data relating to the measurement accuracy or the data density, or colour information, which are ascertained by means of a camera (not depicted here) of the measuring device 1.

For 3D-scanning purposes, there is the aforementioned sweeping as illustrated, for example by virtue of the targeting unit or upper part 91 of the measuring device 1 being rotated step-by-step or continuously about the first, vertical axis a1 in relation to base 90 such that the measurement radiation 10 is swept in the horizontal direction (indicated by arrow 92a) and by virtue of a swivable optical component 97, e.g. swivel mirror, being rotated about horizontal axis a2 such that the measurement radiation 10 is swept in the vertical direction, too (indicated by arrow 92b). Instead of a mirror 93, an aiming telescope can be rotated around the axis a2.

As a result, the object surface 100 is scanned e.g. in an object point grid as illustrated, with a measurement rate of at least 1000 object points per second or even a million points per second. In other words, at least a thousand 3D coordinates of different object points Px are generated per second. The scan region or measuring region is for instance 360°—i.e. a complete revolution—about the vertical axis a1, in the horizontal direction and e.g. 270° in the vertical direction such that a spherical scan region is present, the latter containing al most all object points Px within the entire surrounding region in all spatial directions within the measurement range. The maximal measurement range is predefined and depends on a configuration of scanning device 1 and is for metrological use cases for example several ten meters up to several hundred meters. The measuring device 1 and method as claimed and described in more detail below enable on-the-fly or real-time focusing of measurement beam 10 within the whole measurement range. Amongst others, the claimed focus adjustment with high speed (adaption frequency of kHz or more) enhances measurement precision, in particular a much better lateral resolution (resolution perpendicular to the propagation direction of the measurement radiation 10).

FIG. 2 shows a purely schematic first embodiment of an optical design for a measuring device resp. its targeting unit. An objective-lens unit or aperture 3, having a defined exit or emitting aperture diameter A for the emitting beam, for example of 8 to 15 millimetres, and a defined entry or receiving aperture diameter B for the receiving beam, for example, of 40 millimetres. The associated path from a target or object to be sighted through the objective-lens unit 3 are used to define an optical target axis 94 which needs to be oriented to the target or object to be observed. The exit aperture 3 may be of multi-lens design, and/or a zonal structured optics or a simple exit window, depending on the physical realisation of the measurement instrument.

The arrangement shown is equipped with means for electrooptical distance measurement. To this end, as shown in FIG. 2, it is possible to use a measurement light source 4 such as a laser light source e.g. emitting in the visible or in the near infrared spectral range. Preferably the wavelength is chosen in the infrared region because of less restrictive eye safety limits. This radiation is invisible to the human eye, typical wavelengths are 850 nm, 905 nm, 940 nm, 1310 nm or 1550 nm. Along the emitting beam path 9, beginning at the light source 4, the measurement radiation 10 from which is deflected by means of an optical deflection element 8a, for example a mirror, onto a further optical deflection element 8b, for example a dichroic beam splitter which reflects in the spectral range of the light source 4 and transmits in the remainder of the spectral range, and from there onward through the objective-lens unit 3 with exit aperture opening A as free beam 10 to the object to be scanned (not shown). The emitting beam path 9 as understood ends at aperture 3.

A portion of the light 10r reflected diffusely (e.g. in the case of a natural target) or directionally (e.g. in the case of a retroreflector) from the target, captured by the objective-lens unit 3 with entry aperture opening B and having the wavelength of the light source 4 passes through or by the deflection element 8b and propagates further to a dichroic output beam coupler or beam splitter 21 which is in a form that reflects light from the emission wavelength of the light source 4 and transmits light from the remainder of the optical spectral range. The measurement light reflected by the dichroic output beam coupler 21 is directed via the deflection element 8b to a high-bandwidth detector 20 (APD, SPAD-Array, SiPM, etc.) for electrooptical distance measurement. By way of example, the light source 4 may be pulsed and the distance measurement can take place in a known manner by determining pulse propagation times or phase differences between emitted and reflected light.

Above that, the device comprises an autofocus optical module 7, too, situated in the emitting beam path 9 as shown in the figure. In the example, the autofocus optical module 7 comprises a variable focal length lens 2, having a lens diameter L (for example 2 millimetres), a collimator lens 5 and optionally a relay lens 6. As shown, the variable focal length lens 2 is located between the collimation lens 5 and the near field of the light source 4, whereby preferably the lens 2 is placed directly after the light source's near field (optical source plane of the imaging optics).

As an alternative to the variable focal length lens 2, the autofocus module comprises a reconfigurable optical phase plate, e.g. a dynamic hologram or spatial light modulator, using its focusing properties. The descriptions apply to embodiments with a reconfigurable optical phase plate, too, if not indicated otherwise.

Lens 2 is in itself variable with respect to its focal length, i.e. the focus is adjustable without changing the position of lens 2 along beam path 9. That is, an activation-dependent axial change of the transmitted beam 10 occurs by lens 2. The entire tuneable lens 2 as an optical element is not shifted in its position or alignment in the device resp. along the beam path, however, but rather is fixedly installed. The so-called optical power of the lens 2 is varied or adjusted by changing the shape of the lens-body. An exemplary embodiment in more detail of a varifocal lens 2 is described below with respect to FIGS. 6a-c.

The response time of varifocal lens 2 is under one millisecond. That is, a change of focal length or adaption of focus of beam 10 without any moving lens is possible within a millisecond, for example within several hundred microseconds or even faster, for instance 10 microseconds at most. Therewith, autofocus optical subsystem 7 adapts automatic focus within a single object point measurement period, from object point to object point or said otherwise for every single measurement. In the example, the measurement beam is continuously optimized for each subsequent point of the object's surface during scanning by variable focal length lens 2.

In this purely exemplary embodiment, as an optional addition the metrological surveying device comprises an on-axis camera sensor 23 with pixel-defined resolution used to acquire a camera image of an object or target that is to be measured. Thus, a camera having for example a CCD or CMOS image sensor, but also or additionally as a RIM sensor (RIM=range imaging), is present. Furthermore, in between the objective-lens unit 3 and sensor 23 there is a camera focusing element 22, the positioning of which can be altered along the axis 94, for altering the focusing position for the camera light captured by the objective-lens unit 3. As an alternative to the on-axis camera sensor 23, a reticule defining the targeting direction 94 combined with an eyepiece could be implemented which allows visual aiming to the target object 100 (cf. also FIG. 1).

Figure 3:
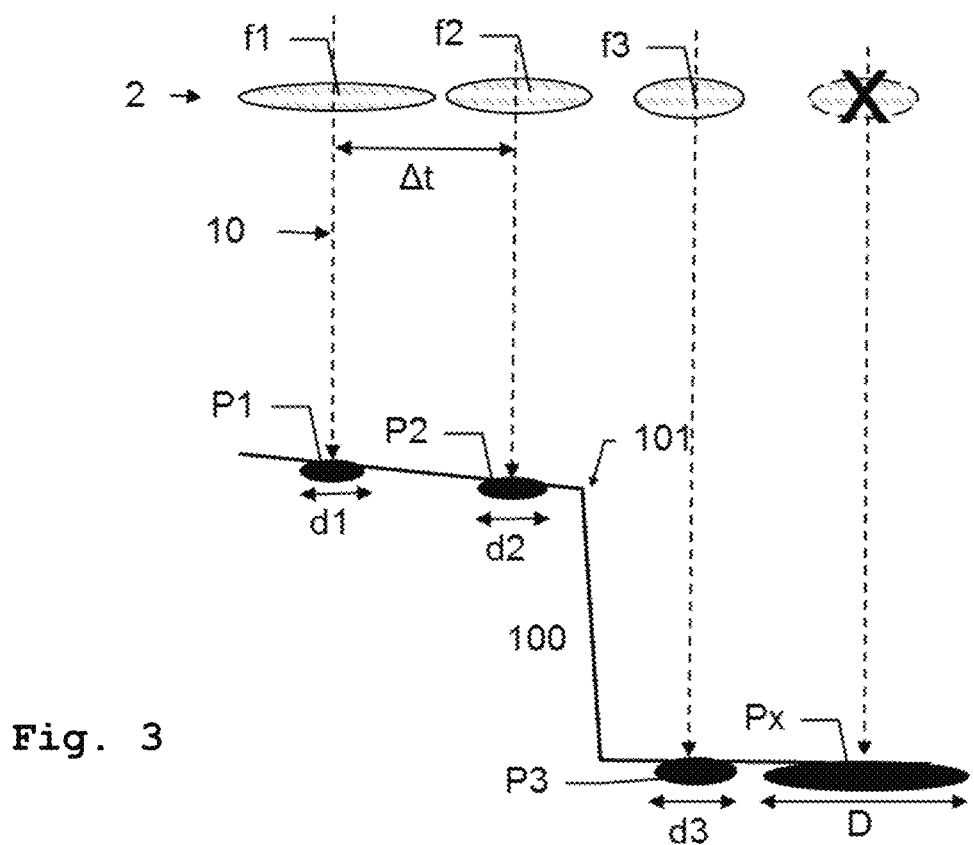
FIG. 3 shows an exemplary illustration of point-to-point measurement beam focusing.

FIG. 3 shows the real-time pointwise focusing in a schematic example. Depicted is in the upper part varifocal lens 2 in three different focal states f1, f2 and f3. In the example, the variation of focal length is done by deformation of lens 2 whereby deformation quantity is purely for purpose of better illustration. The time Δt for setting or changing focal length between two subsequent focal states is far below 1 ms.

In the example, focusing is done from point P1 to P2 and further P3, object points P1-P3 representative for the millions of object points measured. That is, beam 10 is focused by lens 2 with focal length f1 or optical power 1/f1 on first object point P1, then beam 10 is directed on next object point P2 (by rotation of targeting axis as described above according to a scanning grid for example), then focus is adjusted using lens 2 (change from focal length f1 to f2), then beam 10 is pointing to subsequent point P3, focused thereon and so on. The distance measuring light is modified in such a manner by lens 2 that its beam waist comes to rest on each single target point P1-P3.

Focus of measurement beam 10 is adjusted with a frequency of at least 1 kHz, for example with 10 kHz or 100 kHz. That is, though there is a measurement rate of thousands or more object points P1-Pn per second, single point focusing is performed. That is, there is individual focus adjustment for the object points whilst scanning. For example, with a scanning rate from measuring point to measuring point of a few microseconds, the focus is adjusted along the trace on the surface at every point. The adjustment of the lens 2 is done in between and thus even faster.

Instead of fix adjusting the focus of the varifocal length to the estimated distance, varifocal lens 2 can also be operated in a continuous manner, e.g. sinusoidal with a much higher frequency, for example, greater than 100 kHz. Thus, the focus is swept continuously from close range to infinity while scanning object points. Focus is adapted in that a trigger is used to define at which focus state the receiver signal is processed or, as another option, when measurement light is passing through the system. Alternatively, several focus states can be measured by adapting the trigger, respectively.

By continuously focusing beam 10, its light spot on the surface of object 100 can be kept substantially smallest possible, independently of the geometry of object 100. That is, surfaces 100 sloped or stepped with respect to beam direction as shown in the figure, are nevertheless covered with smallest possible light spots, i.e. their diameter d1, d2 and d3 are of smallest achievable lateral size, resulting in a point grid of highest spatial resolution, and considerably better than prior art.

The diameter of the scanning beam (the spot size) at a respective object point P1-P3 can be kept smaller than with instruments of the state of the art or can be optimized to be as small as possible within the borders of the instrument's optical configuration (e.g. considering limiting factors such as exit aperture size or beam divergence). This improvement is illustrated in comparison to measuring of an object point Px without varifocal lens 2 as shown at the right side of FIG. 3. There, the measurement beam is not focused in real time within a single object point measurement period by a varifocal lens 2 wherefore its spot diameter D at point Px on surface 100 is much bigger than the diameters d1-d3 of the focused spots at points P1-P3.

Such a big spot size not only results in a rather low (lateral) spatial resolution of the measuring in general, but is also in particular disadvantageous when the spot size is big in relation to the object details to be surveyed or scanned. In the example, the object 100 has a relatively narrow or fine edge 101. If measured with a big spot like the spot at point Px, the fine edge 101 cannot be resolved as part of the light spot is on the "top" of the edge 101, another part on the "bottom", resulting in a "smeared" so called mixed-pixel distance value. This ends for example in a point cloud or surface representation with a curve instead of an edge showing sharp lines.

However, the inline autofocus, focusing for each object point P1-P3, not only allows a high-speed beam adaption to a change of object distance even if this change is high or a sudden one such as from point P2 to point P3 but enables a fine spatial resolution due to relatively small beam diameter at an object point P1-P3 with considerably improved imaging of object details.

Figure 4:
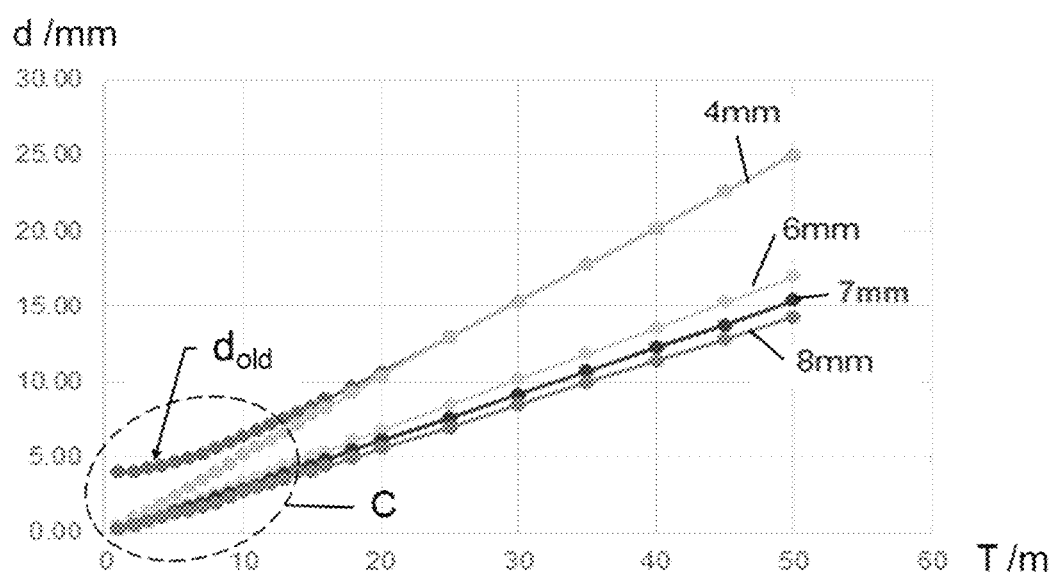
FIG. 4 shows an illustration of measurement beam diameter vs. measurement distance.

FIG. 4 illustrates the dependence of the beam diameter resp. spot size d (vertical axis) of the measurement distance T (horizontal axis). Due to divergence of the beam, its diameter increases with the distance to the object, which is shown within an exemplary measurement range of up to 50 m for four different exit beam diameters, namely 4 mm, 6 mm, 7 mm and 8 mm. The resp. exit aperture sizes are at least 1.3× preferably 1.7× bigger than the 1/e2-diameter of the emitting laser beam at the exit aperture. Maximal measurement range is not restricted to the example shown, but can be for example 20 m, 100 m or 500 m. For the case of 4 mm, there are two lines drawn: the straight one represents the diameter variation, the curved one according to prior art where the emitter has a fix-focus optics.

As can be seen, the autofocusing guarantees in all cases a strictly linear variation of the beam diameter, even in the close range NF (measurement distances from below 1 metre up to about 15-20 m). In the close range NF, the focusing allows to reduce the beam diameter d below its exit diameter, e.g. below the initial diameter of 4 mm or 8 mm diameter, thus having a linearly changing spot size within the whole measurement range.

This is not true for scanning device resp. methods known in the art as indicated in the figure: the diameter $d_{old}$ does not fall short of the aperture diameter of e.g. 4 mm, even in the close range C, and therefrom develops from a measurement distance of about 0 m non-linearly. To the contrary, the focusing by the ultra-fast varifocal lens 2 provides a linear relationship between beam diameter d and measurement distance T also for beam diameters d below the beam diameter at the exit aperture resp. in the area directly around the scanning instrument.

In order to cover the whole or maximal predefined measurement range of the scanning device, the focal power range of the varifocal lens is adapted thereto. Said otherwise, the focal power range is large enough that a continuous focusing throughout the complete measurement range, e.g. from 1 m to 50 m as illustrated in the figure (which is e.g. set by other components of the device or chosen with respect to the intended usage) is enabled. There is no switching needed between different focus modi or the like to measure within all the maximal possible object distance. That is, the varifocal lens resp. the autofocus optical module is designed in such a way that it does not impose any limitations or additional efforts on the measurement routine but allows seamless focus change within the complete working range of the instrument. Preferably, the focal power range of the variable focal length lens is at least 10 $m^{-1}$ or at least 20 $m^{-1}$. For example, it ranges from −50 $m^{-1}$ to +50 $m^{-1}$. Depending on the other optical components of the autofocusing module, the power variation in object space and thus the beam focus can be varied between 1 m up to infinity and more to a divergent beam such that also retroreflector targets can be measured easily. That means in object space that the power of the measurement beam varies between −1 $m^{-1}$ to +1 $m^{-1}$.

As can be seen from FIG. 4 too, the object side beam diameter is smaller if the exit the beam diameter is greater. The greatest beam diameter of 8 mm is the line with the smallest effective measurement diameter at the target. The difference is the larger the greater the measurement distance is. That is to say, in particular for mid or long-range instruments, a big beam cross section in the exit aperture is particularly chosen, as depicted in FIG. 2 above or following FIG. 5.

FIG. 5 resembles FIG. 2 but is simpler, showing autofocus optical lens arrangement 7, exit aperture 3, optical deflection element 8a, photodetector 20, beam source 4a, and an additional high-speed autofocus unit 7' in the receiving beam path. The beam source is in the example embodied as a fibre laser source 4a as an example for a point light source. In contrast to the embodiment according to FIG. 2, the autofocus optical unit 7 comprises a first varifocal lens 2 and situated nearby, in the sense of the beam path 9 beforehand, a second high-speed varifocal lens 2a. Both lenses 2 and 2a preferably are of same design and located close to the near field of the light source 4a, where the beam diameter is small. The focal power (range) of autofocus optics 7 is given by the effect of both lenses 2, 2a together. Since the size of the two lenses 2, 2a is small compared to the final emitted exit beam, the switching speed to set a predetermined focal length or optical power again is very short of a few microseconds. This is also possible because the two lenses are electrically energized in parallel.

This configuration with two variable focal length lenses 2, 2a can be used to provide a high achievable distance range, especially to achieve very short distances in the close range C. It is also advantageous compared to a single lens embodiment for measurements to retroreflective tape targets, where the laser beam is slightly defocused to a divergent beam of an angle of 1 mrad.

Above that, it can be used to provide an even more divergent measurement beam when measuring retro-reflective corner cubes, for example with a divergence of 5 mrad. Spoken generally, the (one or more) varifocal lens is in some embodiments used to change the beam's divergence only by alteration of the lens as an adaption to the reflecting nature of the object, e.g. for switching between a reflector measuring set-up for measuring reflecting targets and a reflectorless measuring set-up for measuring scattering or natural targets.

The varifocal lenses 2, 2a are situated in the beam path 9 neither (directly) in front of aperture 3 nor close to the collimator lens 5. They are near to radiation source 4a where the beam diameter is small since the emission angle of a single mode fiber 4a has a typical numerical aperture NA=0.1 or equivalently a beam angle of 11.5 deg. In the example, the distance x1 from lens 2 or 2a (or their common optical center, also called principal plane) to aperture 3 or to the collimator lens 5 (along the beam path, i.e. not the straight geometrical distance) is greater that the distance x2 from the lenses 2, 2a to the radiation source 4a (or the internal emitting bundle of rays of the radiation source). For instance, the ratio of distance x1 to distance x2 is at least 2:1, e.g. 3:1 or bigger.

The arrangement of lenses 2, 2a close to the radiation source resp. far from the exit aperture 3 allows for a big size of exit aperture 3 resp. measurement beam 10 and nevertheless a small size of a lens 2, 2a. The diameter A of the exit aperture or exit beam 10 is (substantially) greater than the lenses' diameter L (cf. also FIG. 2) For example, the ratio of the diameter the measurement beam 10 at its point of exit to the diameter of lens 2, 2a is at least 2:1, 3:1 or 6:1 or bigger, whereby the ratio can be dependent of the optical layout of aperture 3. For example, aperture 3 can comprise a beam expander with a beam expansion ratio of 2.

As said, the exemplary embodiment comprises a second high-speed autofocus module 7' for the received measurement beam. This autofocus module 7' can be in principle of identical design as the first, emitting-side, autofocus module 7 (whereby in the figure, for sake of simplicity, the receiver-side module 7' comprises only one variable focal length lens 2').

Both high-speed autofocus modules, first module 7 and second module 7', are operated synchronously as indicated by connection to controller 17, symbolized as a clock. This enables a reduction of so-called speckles, which is particular advantageous in close range measurements. Specifically, as a preferred option, the autofocus module 7' in the receiving channel is only active for object distances shorter than the radiometric limiting distance. For longer distances, it remains static, e.g. set to infinity.

FIGS. 6a-6c illustrate an exemplary embodiment of a varifocal lens 2 as used in the measuring device, in a frontal view (FIG. 6a) and two side views (FIGS. 6b, 6c) which show the optical axis o, too.

The lens 2 comprises a deformable optical body 13, for example an enclosed transparent polymer, a front window 12f and a back window 12b and has for example a diameter of 6 mm at most, for example 3 mm. In addition, a piezo actuator 14 is present for deforming the thin glass or polymer plates and thus also the transparent volume body 13, e.g. directly attached to the deformable windows 12f, 12b as shown (FIGS. 6b,6c) for direct drive of lens 2, i.e. transmissionless i.e. without any mechanical transmission parts in between actuator 14 and windows 12f, 12b. FIG. 6b shows the lens 2 with no voltage applied on the piezo actuator 14, whereas in FIG. 6c a positive voltage is applied, the piezo actuator is activated to become a bended shape and at least one of the windows is spherically bended, too. The elastic volume body 13 adopts the deformation according to the shape of the windows as illustrated.

The lens 2 is for example manufactured by a wafer-scale method and is embedded in a support 15, the support offering electric contacts 16 (FIG. 6a). More generally spoken, the refraction properties of lens 2 are variable by a shape change which is dynamically activatable during operation of interfaces. The activation of the varifocal lens 2 permits the lens 2—i.e., especially the light-refractive components 12f, 12b and 13—to be deformed in very short time in a controlled manner.

For the case of a fully polymer lens, it can be implemented using a polymer membrane which is changed in the curvature thereof in a manner activated by actuators 14 in order to set the refraction properties. The material of such a polymer lens can be selected from the group comprising, for example, polyethylene glycol dimethacrylate (PEGDM), hydroxyethyl methacrylate (HEMA), copolymers of PEGDM and HEMA, hydrogel, silicone, soft silicone, polysiloxane, polyethylene, polypropylene, modified polystyrene, or polyurethane.

As another option (not shown), the lens comprises a liquid optical medium and its refractive index is variable using acoustic waves. For example, using a piezo driver 14, acoustic oscillations with kHz frequency are sent in radial direction, resulting in (local) fluctuations of the liquid and thus of the refractive properties. Thus, the focal length varies periodically within periods of under 1 ms. The measurement focus is adjusted for a respective targeted object point in that the measuring of this object point is carried out exactly then when the desired or optimal focal length of the lens and therewith desired or optimal measurement beam focus is present. Said otherwise, the focus is adapted in real-time within a single point measurement period by controlled timing or triggering of measurement acquisition using a varifocal lens with periodical high-speed variation of focal length, the timing being controlled—e.g. by the autofocus module itself—depending on the frequency of focal length variation or oscillation or drive frequency. The focal length is varied continuously (back and forth) using the acoustically driven liquid lens and the focus adaption (picking of the focal state individually adapted to the current object point) is on the receiver side.

In any case, the actuator 14 has a high acceleration. The activation time is in the range of microseconds, at least lower than one millisecond, however preferably only some microseconds. Thus, even a demand of a sharp change of focus, e.g. a sudden change of measurement distance from one object point to the next one at an edge or the like, can be fulfilled.

The lens 2 is thereby designed in such a way that the very fast reaction time is at least substantially constant or not substantially diminishing within a wide temperature range, in particular in between 233K to 343K. The at least one activated piezo-electric element 14 changes its shape by applying a voltage. The movement is as fast as the change of applied voltage which typically can go from −50V to +50V. The change of the shape is transferred to the thin glass plate whereas the shape of the glass plate changes from a flat surface to a spherical concave or to a spherical convex surface depending on the amplitude and sign of the voltage. The focal power or focal length of lens 2 changes in $1^{st}$ order proportionally to the amplitude of electrical voltage signal.

Thereby, the range of focal power is broad, the focal power of the lens ranges for example from −6 dpt to 12 dpt. This allows wide range autofocus adaption of the beam in object space, and this even in case lens 2 is arranged in the beam path close to the nearfield of the laser source and far from the exit aperture, which again allows a bigger aperture resp. big exit beam diameter and thus a finer beam focus or smaller spot size at an object point compared to a smaller aperture resp. beam diameter at the point of exit from the measuring device.

In addition, there can also be a sensor for determining the present lens shape. These can be implemented, for example, as electrodes for the capacitive determination of the current shaping of the lens 2, for example, as further segments along the lens circumference. In addition to such a direct shape determination of the lens 2, the current optical refraction characteristic of the lens 2 can also be detected by corresponding magnetic or optoelectronic sensors.

Figure 7A:
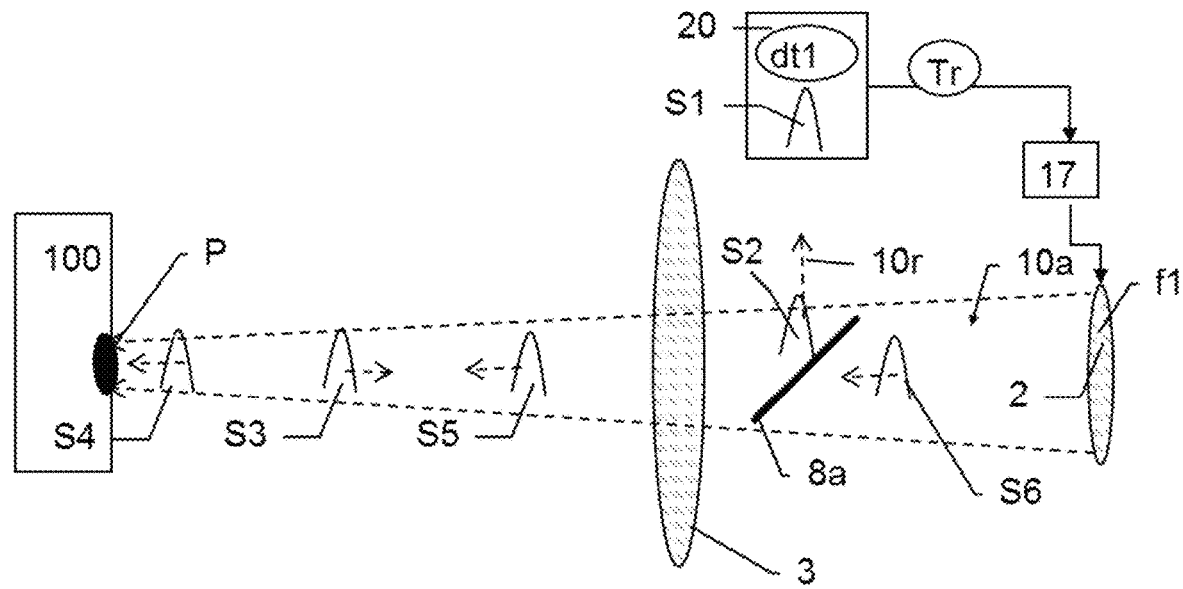
FIG. 7a, 7b show an exemplary illustration of steering of a variable focus length lens.

FIGS. 7a,b illustrate an example of a method for autofocusing. Besides varifocal lens 2, beam splitter 8a, aperture 3 and object 100 with a measured object point P, the measurement beam 10a, 10r is shown to be composed of a sequence of single shots S, for example shots S1-S6 as illustrated in FIG. 7a (shots S4-S6 on their way to the object 100, i.e. part of the emitted beam 10a, shots S1-S3 already returning form object 100, i.e. part of the return beam).

Using detection unit 20, a time of flight is determined for each shot S, e.g. a time dt1 for first shot S1, and therefrom the distance T to the object. The distance T for object point P is determined based on the values of a predefined length of a sequence of shots S together.

In case of pulsed beam source (e.g. laser diode or DFB-seeded fibre amplifier), shots S may represent single pulses, e.g. S1 symbolizes the first pulse of a group of pulses, the measurement value for a respective object point being the sum of the pulse group.

Figure 7B:
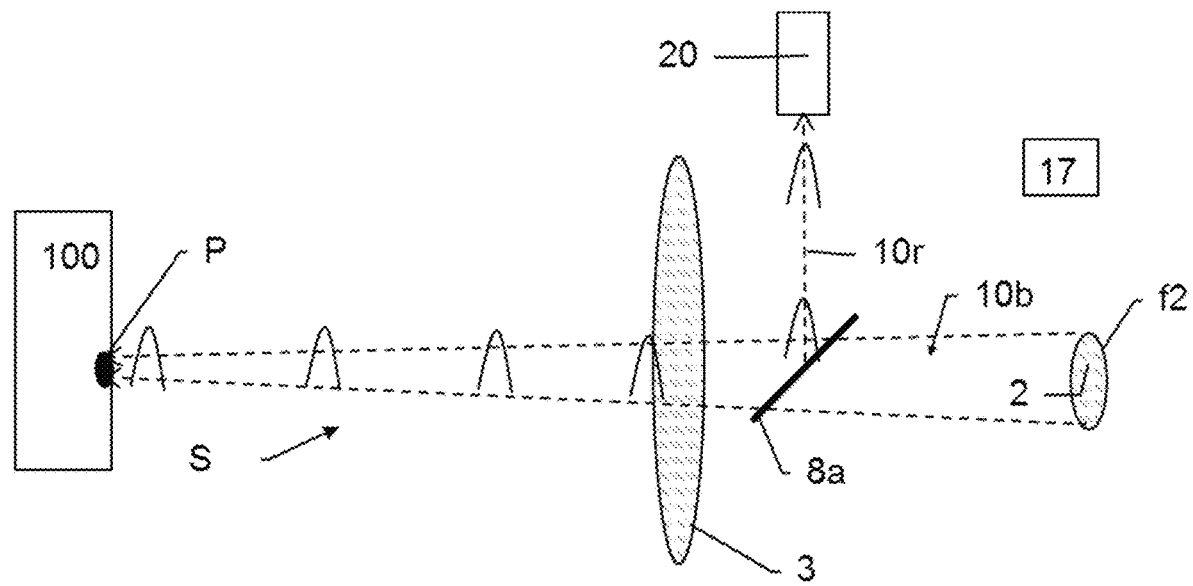

For the purpose of automatic focusing, the first shot S1 resp. the (rough) distance Tr to the object 100 (derived from the travel time dt1) is fed into a focus controller 17. According to the distance value Tr, controller 17 changes the focal length of lens 2, e.g. by piezo actuator described with respect to FIG. 6. In the example, the initial focal power f1 is changed to the adapted focal power f2 by deformation of lens 2. Thus, the focus of measurement beam is changed (symbolized by "smaller" beam 10b and spot size in FIG. 7b compared to beam 10a of FIG. 7a).

Thus, a first shot S1 or a number of first shots S1-S6 is used for focus adaption, the rest of the shots S for point P are then optimally focused. The distance values for the first "unfocused" shots may be disregarded for the final measurement value of point P, for example dependent on the degree of focal length change effectuated (e.g. only if the degree surpasses a defined threshold or ratio, their values are discarded; otherwise there are taken into account). The setting of the focal power f2 follows according to a factory-calibrated characteristic curve which describes the relationship between the focal distance Tr of the system and the control signals applied to the variable focal length lens.

Alternatively, a first shot S1 or a number of first shots S1-S6 for focus control is a separate probe measurement, completely distinct from the "true" point measurement from the very beginning. In other words, there is a rough measurement first for focus adaption purposes and a second fine measurement for scanning purposes.

As an alternative or additional option to the autofocus control by an initial coarse distance measurement as described above, autofocus is controlled as a sort of predictive method. That is to say that the degree of focus change from point to point or along the object surface 100 already measured is used to adapt the focus. An estimation for focus setting is predicted using slope or curvature information along the scanline, e.g. first or second derivative of measured object distance or a focus gradient.

Other alternative or additional options are model-based approaches, e.g. the focus setting is derived from a priorly known digital surface model of the object 100. The pre-known digital model can be one of an object type, e.g. before scanning the operator selects a specific object type, sort or class from a list, or the model is an individual one, e.g. derived from a previous measuring of the specific object, for example if an object has to be scanned multiple times in the course of its building or manufacturing process in the case of a larger object such as a building or vehicle.

Another option is to use an image of the object 100 which is for example captured with image sensor 23 shown in FIG. 2, whereby for example the image is image processed for feature identification or for object classification. Nowadays, known smart image processing methods are based on artificial intelligence or machine learning. Further, in such camera or image-based solutions, edges around patches, corners, signatures like holes or slits can be used to control the scanning speed of the laser beam along the scanning line or even to modify and adapt the scan pattern. For example, the direction of the scanline can be redirected to become orthogonal to an edge to be scanned or in case of a hole, the scan pattern can be adapted to be wire wheel-like.

Figure 8:
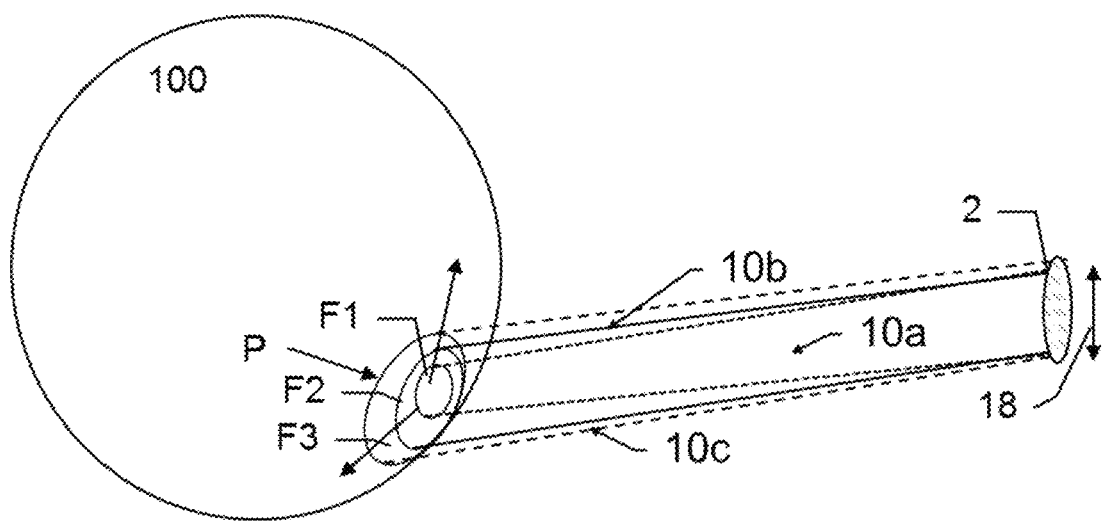
FIG. 8 shows an example of multi-foci measuring of an object point.

FIG. 8 illustrates a further development of the scanning method. For better clarity, only the variable focal length lens 2 is shown of the scanning device and the object 100 to be scanned, in the example a sphere.

In this embodiment, each object point P is measured with more than one adapted focus. This multi-foci measurement can take place within a single measurement series of laser shots for a respective object point P, i.e. the focus is adapted during the usual or standard sequence of laser shots targeted on one object point P. Thus, the procedure of laser firing can be kept unaltered when changing from measuring with a single adapted focus for an object point to measuring an object point P with multiple adapted foci.

In this example, lens 2 is varied (indicated by arrow 18) to three different focal length, wherefore the measurement beam is emitted in three different focal states 10a, 10b, 10c. Accordingly, the beam measuring the same point P changes its size on the object surface from F1 to F2 and F3. The light spot's diameter at point P increases.

In every focal state F1-F3, a distance measurement is affected for point P based on the respective measurement beam 10a-10c. If the distance value increases with increasing light spot diameter, then it can be concluded that the object's surface is convex. If the distance value decreases with increasing light spot diameter, then it can be concluded that the object's surface is concave. If there is no change in distance despite focus change, then the object area at point P is flat.

In addition, the degree of distance change or distance value gradient can be evaluated in order to derive an information about the extent of slope or curvature of the surface 100. In the example, the sloped or curved surface of the sphere can be determined. This can be employed when scanning a reference sphere in metrological application, e.g. to quickly determine its radius or centre. For example, such a measuring of a reference sphere or the like is part of an object measuring or scanning procedure or method.

A skilled person is aware of the fact that details, which are here shown and explained with respect to different embodiments, can also be combined in other permutations in the sense of the invention if not indicated otherwise.

What is claimed is:

1. An opto-electronic measuring device for point cloud acquisition by scanning measuring of an object's surface with a measuring rate of at least one thousand object points per second comprising:
   a base and a targeting unit defining a target axis for targeting the object to be measured, the targeting unit being rotatable in relation to the base,
   a light source for generation of a measurement beam, an exit aperture for emitting the measurement beam as a free beam in direction of the target axis towards a point on the object's surface to be measured and with an internal emitting measurement beam path,
   wherein a high-speed autofocus optical module, situated in the internal emitting measurement beam path, the high-speed autofocus optical module being designed for a real-time measurement focus adaption within a single object point measurement period and comprising at least one variable focal length lens or reconfigurable optical phase plate having a response time of under 10 µs.

2. The opto-electronic measuring device according to claim 1, wherein the real-time focus adaption is an individual adaption of measurement beam focus for a respective object point.

3. The opto-electronic measuring device according to claim 2, wherein the high-speed autofocus optical module comprises at least one collimation lens whereas the variable focal length lens or the reconfigurable optical phase plate is located between the collimation lens and the near field of the light source.

4. The opto-electronic measuring device according to claim 1, wherein the high-speed autofocus optical module comprises at least one collimation lens whereas the variable focal length lens or the reconfigurable optical phase plate is located between the collimation lens and the near field of the light source.

5. The opto-electronic measuring device according to claim 1, wherein the focal power range of the high-speed autofocus optical module is adapted to a predefined maximal measurement range of the device in such a way that by variation of the focal length said real-time focus adaption is enabled throughout the whole measurement range.

6. The opto-electronic measuring device according to claim 5, wherein the whole measurement range includes the close range down to 1 m from the exit aperture of the device or the measurement range being between 1 m and 20 m or 1 m and 1000 m.

7. The opto-electronic measuring device according to claim 1, wherein the variable focal length lens or the reconfigurable optical phase plate has a focal power range of at least from 0 m-1 up to 10 m-1 or from −6 m-1 up to 6 m-1 or −3 m-1 up to 10 m-1.

8. The opto-electronic measuring device according to claim 1, wherein the diameter of the measurement beam at the exit aperture is at least 6 mm.

9. The opto-electronic measuring device according to claim 1, wherein the ratio of the diameter of the measurement beam at the exit aperture to the diameter of the measurement beam at the aperture of the variable focal length lens or the reconfigurable optical phase plate is at least 2:1.

10. The opto-electronic measuring device according to claim 1, wherein the diameter of the variable focal length lens or the reconfigurable optical phase plate is 6 mm; at most.

11. The opto-electronic measuring device according to claim 1, wherein the variable focal length lens comprises a deformable body confined within two optical surfaces deformable by at least one piezo-electric element actuator mechanically coupled to the deformable body in order to change the lens' focal length by an axial symmetrical bending or deformation.

12. The opto-electronic measuring device according to claim 1, wherein a receiver high-speed autofocus module designed for real-time focus adaption for received light to a receiving detector optics of the opto-electronic measuring device in operation synchronous to the high-speed autofocus optical module.

13. A method for three dimensional opto-electronic light based scanning of an object's surface, for a laser scanner or laser tracker, with measuring object points with a measurement rate of at least one thousand object points per second using a measurement beam emitted into free space in direction of a target axis towards an object point to be measured, wherein automatic real-time measurement focus adapting within a single object point measurement period, with a frequency of at least 100 kHz.

14. The method according to claim 13, wherein the real-time focus adapting is based on a distance to a respective object point, the distance being measured with the measurement beam:
   as a separate preceding probe measurement of a respective object point directly before the measuring of the object point or
   within the measuring of a respective object point.

15. The method according to claim 14, wherein the real-time focus adapting is based on a distance to a respective object point, the distance being determined:
- as a predictive value based on previous distance or focus trend and/or
- from a preknown digital surface model of the object.

16. A computer program product comprising program code, which is stored on a machine-readable medium, and having computer-executable instructions for performing, when run on an opto-electronic measuring device, the method according to claim 14.

17. The method according to claim 13, wherein the real-time focus adapting is based on a distance to a respective object point, the distance being determined:
- as a predictive value based on previous distance or focus trend and/or
- from a preknown digital surface model of the object.

18. The method according to claim 17, wherein the object point is measured using a sequence of radiation pulses and the distance is determined using a number of first pulses of the sequence.

19. The method according to claim 17, wherein measuring object points with at least two different foci of the measurement beam, wherein for each focus setting a distance to the object point is deduced.

20. The method according to claim 13, wherein measuring object points with at least two different foci of the measurement beam, wherein for each focus setting a distance to the object point is deduced.

21. A computer program product comprising program code, which is stored on a machine-readable medium, and having computer-executable instructions for performing, when run on an opto-electronic measuring device, the method according to claim 20.

22. A computer program product comprising program code, which is stored on a machine-readable medium, and having computer-executable instructions for performing, when run on an opto-electronic measuring device, the method according to claim 13.

23. The opto-electronic measuring device according to claim 13, wherein the receiver autofocus unit is controlled dependent on the object distance in such a way that only for object distances shorter than the radiometric limiting distance said real-time focusing adaption for received light is active.

* * * * *